United States Patent
Abbott et al.

(10) Patent No.: US 6,770,223 B1
(45) Date of Patent: Aug. 3, 2004

(54) ARTICLE COMPRISING A FARADAY ROTATOR THAT DOES NOT REQUIRE A BIAS MAGNET

(75) Inventors: Robert R. Abbott, Westfield, NJ (US); Vincent J. Fratello, Basking Ridge, NJ (US); Steve J. Licht, Bridgewater, NJ (US); Irina Mnushkina, Randolph, NJ (US)

(73) Assignee: Integrated Photonics, Inc., Birmingham, AL (US)

( * ) Notice: Subject to any disclaimer, the term of this patent is extended or adjusted under 35 U.S.C. 154(b) by 62 days.

(21) Appl. No.: 10/318,218

(22) Filed: Dec. 13, 2002

(51) Int. Cl.$^7$ ................................................. G02F 1/09
(52) U.S. Cl. ..................... 252/582; 252/584; 359/280; 359/324; 428/692; 428/702
(58) Field of Search ............................... 359/321, 324, 359/280, 281, 282, 283, 284; 252/582, 593, 584, 585; 428/692, 702

(56) References Cited

U.S. PATENT DOCUMENTS

| | | | |
|---|---|---|---|
| 5,021,302 A | | 6/1991 | Brandle, Jr. et al. |
| 5,608,570 A | | 3/1997 | Brandle, Jr. et al. |
| 5,616,176 A | * | 4/1997 | Fukuda et al. ................ 117/54 |
| 5,801,875 A | | 9/1998 | Brandle, Jr. et al. |
| 2003/0072870 A1 | * | 4/2003 | Brandle et al. ............. 427/127 |

FOREIGN PATENT DOCUMENTS

| JP | 5117095 | 5/1993 |
|---|---|---|

OTHER PUBLICATIONS

G. P. Espinosa, "Crystal Chemical Study of the Rare Earth Iron Garnets," J. Chem. Phys., vol. 37 (No. 10), p. 2344–2347, (Nov. 15, 1962).

K. Shinagawa and S. Taniguchi, "Solubility Limits of Bismuth in Rare–Earth Iron Garnets," Japan. J. Appl. Phys., vol. 13 (No. 10), p. 1663–1664 (1974).

G. B. Scott and D. E. Lacklison, "Magnetooptic Properties and Applications of Bismuth Substitute Iron Garnets," IEEE Tans. Magn., vol. 12 (No. 4), p. 292–311, (1976).

G. R. Pulliam, W. E. Ross, B. Macneal and R. F. Bailey, "Large Stable Magnetic Domains," J. Appl. Phys., American Institute of Physics, vol. 53, No. 3 p 2754–58 (1982).

D. Mateika, R. Laurien and Ch. Rusche, "Lattice Parameters and Distribution Coefficients as Function of Ca, Mg and Zr Concentrations in Czochraiski Grown Rare Earth Gallium Garnets," J. Cryst. Growth, vol. 56, p. 677–689, (1982).

P. Hansen and J.–P. Krumme,, "Magnetic and Magneto–Optical Properties of Garnet Films," Thin Sold Films, vol. 114, p. 69–107, (1984).

C.–P. Klages and W. Tolksdorf, "Segregation in Garnet LPE," J.Cryst. Growth, vol. 79, p. 110–115, (1986).

(List continued on next page.)

*Primary Examiner*—Paul Thibodeau
*Assistant Examiner*—Kevin M. Bernatz
(74) *Attorney, Agent, or Firm*—Locke Liddell & Sapp LLP

(57) ABSTRACT

Faraday rotator garnet thick films have improved specific Faraday rotations without requiring a bias magnet. Films of nominal composition $Bi_X(Eu_ZHo_{1-Z})_{3-X}Fe_{5-Y}Ga_YO_{12}$ are grown lattice matched to available $\{Gd_{2.68}Ca_{0.32}\}$ $[Ga_{1.04}Mg_{0.32}Zr_{0.64}](Ga_3)O_{12}$ substrates. The film is prepared with $Z \leq 0.45$, which allows higher concentrations of Bi to be included in the film than prior compositions. The increased amount of Bi results in a higher specific Faraday rotations for the film. For devices such as non-reciprocal optoelectronic devices that require 45-degree rotators, the increased specific Faraday rotation results in the use of thinner films of reduced path length as well as increased crystal growth yields.

23 Claims, 2 Drawing Sheets

OTHER PUBLICATIONS

H. Legall, M. Guillot, A. Marchand, Y. Nomi, M. Artinian and J. M. Desvignes, "Faraday Rotation in Bismuth Substituted Iron Garnets," J. Magn. Soc. Jpn., The Magnetics Society of Japan (Japan), vol. 11 (No. S1), p. 235–240, (1987).

J. F. Dillon, Jr., S. D. Albiston and V. J. Fratello, "Magnetooptical Rotation of PrIG and NdIG", J. Magn. Soc. jpn., The Magnetics Society of Japan (Japan), vol. 11 (No. S1), p. 241–244, (1987).

V. J. Fratello, C. D. Brandle and A. J. Valentino, "Growth of Congruently Melting Ga dolinium Scandium Gallium Garnet," J. Cryst. Growth, vol. 80, p. 26–32, (1987).

T. Tamaki, H. Kaneda, T. Watanabe Andk. Tsushima, "Magno–Optical Properties of Bi–Substituted Magnetic Garnet for a Compact Optical Isolator," J. Magn. Soc. Jpn., The Magnetics Society of Japan (Japan), vol. 11 (No. S1), p. 391, (1987).

T. Okuda, T. Katayama, K. Satoh, T. Oikawa, H. Yamamoto and N. Koshizuka, "New Magneto–Optical Garnet $Bi_3 Fe_5 O_{12}$" Proc. of the Fifth Symposium on Magnetism and Magnetic Materials, World Scientific (Singapore), (1989).

V. J. Fratello, S. J. Licht, C. D. Brandle, H. M. O'Bryan and F. A. Baiocchi, "Effec of Bismuth Doping on Thermal Expansion and Misfit Dislocations in Epitaxial Iron Garnets," J. Cryst. Growth, vol. 142 p. 93–102, (Nov. 19, 1994).

Lucent Technologies, "LPE Faraday Rotator Garnet Films for Optical Isolators and Circulators," Product Brochure, Lucent Technologies (Murray Hill, NJ, US), (1998).

V. J. Fratello and R. Wolfe, "Epitaxial Garnet Films for Non–Reciprocal Magnetooptic Devices, Chapter 3," Magnetic Film Devices, Academic Press (US), p. 93–141, (2000).

Sumitomo Metal Mining, "Faraday Rotators," Product Brochure, Sumitomo Metal Mining (Tokyo, Japan), (2002).

Mitsubishi Gas Chemical, "Magnetic Garnet Single Cystals," Product Brochure, Mitsubishi Gas Chemical Company, Inc. (Tokyo, Japan), (2002).

* cited by examiner

ARTICLE COMPRISING A FARADAY ROTATOR THAT DOES NOT REQUIRE A BIAS MAGNET

FIELD OF THE INVENTION

This invention pertains to articles and systems (collectively "articles") that comprise a Faraday rotator that does not require a bias magnet.

BACKGROUND OF THE INVENTION

Faraday rotator materials are a necessary component in non-reciprocal devices such as magnetooptic isolators, circulators and switches. These devices have found extensive application in telecommunications and other fields. The preferred materials for these applications at telecommunications wavelengths are bismuth-doped rare-earth iron garnets. At the principal near infrared telecommunications wavelengths of about 1310 nm and about 1550 nm, these magnetic garnets have a high degree of transparency and reasonably high specific Faraday rotations (Faraday rotation per unit thickness).

Because these bismuth-doped rare-earth iron garnet materials are not congruently melting, nearly uniform crystals can only be grown by flux techniques, typically by liquid phase epitaxy on substrates of non-magnetic garnet. This technology is well reviewed by V. J. Fratello and R. Wolfe (in Magnetic Film Devices, edited by M. H. Francombe and J. D. Adam, Volume 4 of *Handbook of Thin Film Devices: Frontiers of Research, Technology* and *Applications*, Academic Press, 2000). As is detailed therein, a close room temperature lattice match of the film to the substrate is required to prevent cracking of the film, the substrate or both. Films are generally grown only on one side of the substrate to allow stress relief by bending. To grow a thick film >300 $\mu$m as is required for telecommunications device applications, the film and substrate lattice parameters should match to within ±0.1%~±0.012 A, preferably within ±0.05%~±0.006 Å. The range of film compositions possible is therefore constrained by the available substrate materials.

Bismuth-doped garnet film compositions have an enhanced Faraday rotation over the pure rare-earth iron garnets. Doping with bismuth strongly effects the electric dipole term in the magnetooptic coefficients through superexchange and spin-orbit interactions (see, for example, P. Hansen and J.-P. Krumme, *Thin Solid Films* 114, 69 (1984) and H. LeGall, M. Guillot, A. Marchand, Y. Nomi, M. Artinian and J. M. Desvignes, *J. Mapn. Soc.* Jpn. 11, Supplement S1, 235 (1987)). The total Faraday rotation of the garnet, $\Theta_F$, may be characterized as the sum of the following:

(1) The iron lattice contribution, which can be determined from the Faraday rotation of yttrium iron garnet (YIG-$Y_3Fe_5O_{12}$), $\Theta_F$(YIG), since yttrium is a non-magnetic ion and does not contribute to the magnetic or magnetooptic properties. This iron lattice contribution is a small positive Faraday rotation.

(2) The rare earth (designated as R) contribution, which can be determined from the difference between the Faraday rotations of YIG and a pure-rare earth iron garnet (RIG-$R_3Fe_5O_{12}$), $\Theta_F$(RIG)-$\Theta_F$(YIG). Since bismuth substitutes for rare earths in the garnets, this contribution will be diluted by bismuth substitution. (For data on the pure rare-earth iron garnets at telecommunications wavelengths see J. F. Dillon, Jr., S. D. Albiston and V. J. Fratello, *J. Magn. Soc. Jpn.* 11, Supplement S1, 241 (1987)). These rare earth contributions are typically smaller than the overall iron lattice Faraday rotation and may be positive or negative.

(3) The bismuth contribution, $\Theta_F$(Bi), which is well characterized by a single line shape (see G. B. Scott and D. E. Lacklison, *IEEE Trans. Maqn.* 12, 292 (1976)). This contribution is linearly dependent on the bismuth contribution at least up to 2 atoms per formula unit of bismuth (see T. Tamaki, H. Kaneda, T. Watanabe and K. Tsushima, *J. Magn. Soc.* Jpn. 11, Supplement S1, 391 (1987) and T. Okuda, T. Katayama, K. Satoh, T. Oikawa, H. Yamamoto and N. Koshizuka, *Proc. of the Fifth Symposium on Magnetism and Magnetic Materials*, ed. by H. L. Huang and P. C. Kuo (World Scientific, Singapore, 1989)). This contribution is large and negative.

These contributions yield the approximate formula:

$$\Theta_F(Bi_xR_{3-x}Fe_5O_{12}) = (X/3) \times [\Theta_F(Bi) + \Theta_F(YIG)] + [(1-(X/3)] \times \Theta_F(RIG)$$

If a partial substitution of gallium, aluminum or any other diamagnetic ion is made for any of the iron in the garnet, e.g. $Bi_xR_{3-x}Fe_{5-y}Ga_yO_{12}$, all these Faraday rotations are reduced by dilution, though not necessarily in a linear manner.

As the bismuth doping is increased, its contribution to the Faraday rotation first cancels the small positive contribution of the rare earth iron garnet (for $Bi_xY_{3-x}Fe_5O_{12}$ this occurs at X~0.10–0.15 atoms per formula unit at 1310–1550 nm), then the Faraday rotation increases in magnitude in the negative direction. The upper limit of specific Faraday rotation, $\Theta_F/t$, results from the maximum allowable bismuth doping in the film. This occurs because of the onset of misfit dislocations in the film, which degrade the optical quality unacceptably (see V. J. Fratello, S. J. Licht, C. D. Brandle, H. M. O'Bryan and F. A. Baiocchi, *J. Cryst. Growth* 142, 93 (1994)). This maximum bismuth concentration is a complex function of growth conditions and gallium or aluminum substitution but is typically in the range 1.2–1.5 atoms per formula unit.

The range of film compositions that can be grown is constrained by the lattice match to available substrates. Because bismuth has a large ionic size, substrates with higher lattice parameters are required.

Most commonly used and commercially available in large diameters is calcium-magnesium-zirconium substituted gadolinium gallium garnet (CMZ:GGG-$\{Gd_{2.68}Ca_{0.32}\}$ $[Ga_{1.04}Mg_{0.32}Zr_{0.64}](Ga_3)O_{122}$). The literature value of the lattice parameter of this material is 12.498 Å (D. Mateika, R. Laurien and Ch. Rusche, *J. Cryst. Growth* 56, 677 (1982)), but slightly lower values are sometimes quoted as well.

Some thick film crystal growth has been performed on neodymium gallium garnet (NdGG-$Nd_3Ga_5O_{12}$) substrates of lattice parameter 12.504 Å. However this material has a significantly worse match of coefficient of thermal expansion to the thick film materials than CMZ:GGG or GSGG. Therefore it is more prone to breakage or catastrophic formation of misfit dislocations (V. J. Fratello, S. J. Licht, C. D. Brandle, H. M. O'Bryan and F. A. Baiocchi, *J. Cryst. Growth* 142, 93 (1994). For these reasons NdGG is not suitable as a substrate for thick film garnets with high bismuth concentrations.

The next higher lattice parameter commercially available material is gadolinium scandium gallium garnet (GSGG-$Gd_{2.957}Sc_{1.905}Ga_{3.138}O_{12}$ lattice parameter 12.560 Å (V. J. Fratello, C. D. Brandle and A. J. Valentino, *J. Cryst. Growth* 80, 26 (1987)).

Since, as is stated above, good thick film growth requires a room temperature lattice match of ±0.012 Å, preferably ±0.006 Å, this leaves a considerable lattice parameter range not attainable on commercially available substrates.

To operate most non-reciprocal devices, the magnetic garnet must be maintained in a single domain state. Most magnetic gamets spontaneously demagnetize into multiple domains to minimize their free energy. Device designs have traditionally used a bias magnet to maintain the magnetic garnet in the single domain state required for device operation. However Pulliam et al. (*J. Appl. Phys.* 53, 2754 (1982)) Identified large stable magnetic domains in garnet films and Brandle et al. (U.S. Pat. Nos. 5,608,570 and 5,801,875) identified the necessary magnetic conditions to maintain such domains over the temperature range of device operation. The specific teachings of the Brandle et al. patents are as follows:

(1) To maintain a saturated magnetic state without a bias magnet, a saturation magnetization $4\pi M_s < 100$ G must be maintained over the device operating range, e. g. $-40°$ to $85°$ C.

(2) To this end, the material composition must avoid or minimize rare earth ions with a large $1/T$ temperature dependence of their contribution to the saturation magnetization (e.g. gadolinium (Gd), terbium (Tb) and dysprosium (Dy)).

(3) Because it uniquely reduces the saturation magnetization of the garnet without creating a compensation point, due to its lack of temperature dependence, the concentration of europium (Eu) should be maximized.

(4) Modest concentrations of other magnetic heavy rare earths (e. g. holmium (Ho) through ytterbium (Yb)) can be used to lower the saturation magnetization. Only holmium is effective in this regard for telecommunications applications because erbium has a high absorption in the telecommunications band and the other heavy rare earths (thulium and ytterbium) do not significantly reduce the saturation magnetization. However, no more than modest amounts of holmium are desired because it has a $1/T$ temperature dependence.

(5) To further adjust the saturation magnetization to the necessary range, doping with ions that preferentially substitute for iron on the tetrahedral site (e. g. gallium (Ga) and/or aluminum (Al)) is required. Because aluminum has a lower site preference for the tetrahedral site, it is less effective in reducing saturation magnetization and has the added disadvantage of reducing the Curie temperature to the detriment of high temperature assembly, storage and operation conditions. If Al is mixed with Ga as a dopant, it also complicates process control of crystal growth. Because of its nonunity distribution coefficient, there is typically a gradient of Al through the film thickness and consequently a variation of film parameters from ideal. Therefore doping with aluminum is contraindicated for making magnedess Faraday rotator materials.

Brandle et al. (U.S. Pat. Nos. 5,608,570 and 5,801,875) identified three compositions, $Bi_1Eu_1Ho_1Fe_4Ga_1O_{12}$, $Bi_{0.75}Eu_{1.5}Ho_{0.75}Fe_{4.1}Ga_{0.9}O_{12}$ and $Bi_1Eu_2Fe_4Ga_{0.5}Al_{0.5}O_{12}$, all of which approximately match the lattice parameter of CMZ:GGG. Note that all these compositions have europium concentrations C(Eu) greater than or equal to the holmium concentrations C(Ho). Commercially available samples of the preferred composition from Lucent Technologies and Sumitomo Metal Mining have compositions of approximately $Bi_X(Eu_{0.5}Ho_{0.5})_{3-X}Fe_{5-Y}Ga_YO_{12}$ with X approximately in the range 1.1 to 1.2 atoms per formula unit and Y in the range 0.9 to 1.0 atoms per formula unit. Once again, these compositions show the concentration of europium approximately equal to the concentration of holmium. In addition, Brandle et al. teaches that only a modest amount of holmium is acceptable, while the europium concentration should be maximized. This clearly suggests that the concentration of europium should be greater than or equal to the concentration of holmium. In addition, all Faraday rotator products currently on the market have $C(Eu) \geq C(Ho)$. Therefore, one of skill in the art would understand that the concentration of europium should be greater than or equal to the concentration of holmium.

In the prior art, the degree of bismuth doping is effectively constrained to be $X<1.2$ atoms per formula unit by the following constraints:

(1) The lattice parameter of the garnet film is constrained to match that of CMZ:GGG, effectively 12.486–12.510 Å, preferably 12.492–12.504 Å. There are no hypothesized effective magnetless compositions that lattice match GSGG (gadolinium scandium gallium garnet), which is the next higher lattice parameter (12.560 Å) substrate.

(2) $C(Eu) \geq C(Ho)$ places a lower limit on the host rare-earth iron garnet lattice parameter (prior to doping with bismuth and gallium). The lattice parameter of $Eu_3Fe_5O_{12}$ is 12.498(3) Å and that of $Ho_3Fe_5O_{12}$ is 12.375(3) Å (G. P. Espinosa, *J. Chem Phys.* 37, 2344 (1962)) where the fourth decimal place (in parentheses) is considered approximate. Using Vegard's law, the lattice parameter of a 1—1 solid solution $Eu_{1.5}Ho_{1.5}Fe_5O_{12}$ is approximately 12.437 Å. Solid solutions with $C(Eu) \geq C(Ho)$ will have a lattice parameter $\geq 12.437$ Å. Substitution with Ga slightly decreases the lattice parameter of the host garnet by $-0.018$ Å/(a/fu) so that the nominal lattice parameter of $Eu_{1.5}Ho_{1.5}Fe_{4.05}Ga_{0.95}O_{12}$ is 12.420 Å.

(3) Bismuth increases the lattice parameter of the film as it is substituted for the combination of rare earths. The measured lattice parameter of a highly defective $Bi_3Fe_5O_{12}$ was 12.623 Å (T. Okuda, T. Katayama, K. Satoh, T. Oikawa, H. Yamamoto and N. Koshizuka, *Proc. of the Fifth Symposium on Magnetism* and *Magnetic Materials*, ed. by H. L. Huang and P. C. Kuo (World Scientific, Singapore, 1989)). For the prior art composition $Bi_X(Eu_{0.5}Ho_{0.5})_{3-X}Fe_{4.95}Ga_{0.05}O_{12}$ on CMZ:GGG, the range of acceptable lattice matches in constraint 1 has been empirically found to limit $X<1.2$. This can be seen further from the relation $$C_{match}(Bi) = 3 \times [LP(CMZ:GGG) - LP(Eu_{1.5}Ho_{1.5}Fe_{4.05}Ga_{0.95}O_{12})] /$$
$$[LP(Bi_3Fe_5O_{12}) - LP(Eu_{1.5}Ho_{1.5}Fe_{4.05}Ga_{0.95}O_{12})]$$
$$= 3 \times [12.498 - 12.420] / [12.623 - 12.420]$$
$$= 1.15 \text{ atom/formula unit}$$

(4) Aluminum must be avoided for the reasons given above. Replacement of all or some of the gallium in the film with aluminum could otherwise be used to reduce the lattice parameter and allow more bismuth doping within constraints 1 and 2.

The largest magnitude specific Faraday rotations commercially available in magnetless Faraday rotator materials (those which do not require a bias magnet) according to the invention of Brandle et al. (U. S. Pat. Nos. 5,608,570 and 5,801,875) are approximately $-0.09$ degrees/micron at 1550 nm. This means that a typical 45 degree Faraday rotator as is required for a magnetooptic isolator will have a thickness of approximately 500 microns for this wavelength (Sumitomo Metal Mining *Product Brochure*, 2002, Lucent Technologies *Product Brochure* D S FR.5, July 1998). Additionally a magnetless material not according to the invention of Brandle et al. (containing large amounts of Tb) is manufactured by Mitsubishi Gas Chemical with a specific Faraday rotation of approximately $-0.096$ degrees/micron and a thickness of 470 microns for a 45 degree Faraday rotator at 1550 nm (Mitsubishi Gas Chemical *Product Brochure*, 2002). However this material has a high saturation magnetization away from room temperature that strongly limits its range of usefulness for magnetless applications.

In contrast, the largest magnitude specific Faraday rotations commercially available in standard Faraday rotator materials (those that require a bias magnet) are −0.125 degrees/micron at 1550 nm. This means that a typical 45 degree Faraday rotator as is required for a magnetooptic isolator will have a thickness of 360 microns for this wavelength (Mitsubishi Gas Chemical *Product Brochure*, 2002). This can be accomplished because more variation in the rare earth composition is possible so that lattice matched standard (high magnetization) Faraday rotator films can be grown on CMZ:GGG with 1.2–1.5 atoms per formula unit of bismuth. Consequently, there is still a need for a Faraday rotator that does not require a bias magnet and yet has a larger specific Faraday rotation than the magnetless Faraday rotators currently available.

SUMMARY OF THE INVENTION

A Faraday rotator thick film that does not require a bias magnet and has an improved specific Faraday rotation over the prior art films. Films of nominal composition $Bi_X(Eu_ZHo_{1-Z})_{3-X}Fe_{5-Y}Ga_YO_{12}$ are lattice matched and grown on available CMZ:GGG substrates. However, the fraction of europium in the rare earths used is kept less than about 0.45. This allows a higher concentration of Bi to be incorporated into the film, while still keeping the film lattice matched and the saturation magnetization low enough for the film to have a single magnetic domain through its operating range. The higher Bi concentrations give the film a higher specific Faraday rotation. As a result, thinner films can be used in devices that require a rotator with a specific degree of rotation. The thinner films have a shorter path length and improved crystal growth yields over the thicker prior art films.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DETAILED DESCRIPTION

Figure 1:
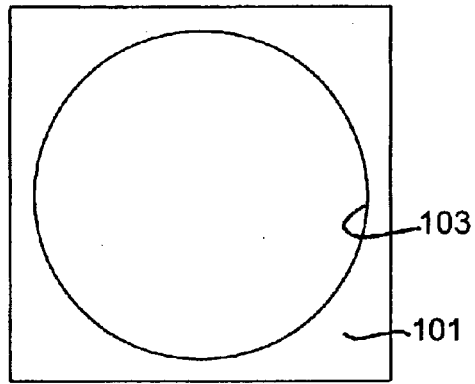
FIG. 1 shows a front elevation view of a Faraday rotator die according to the invention.
Figure 2:
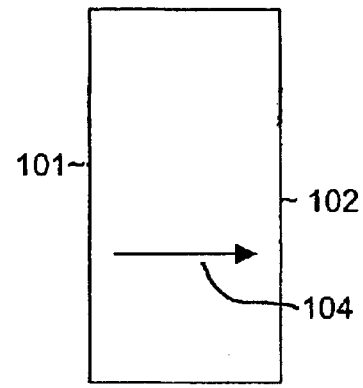
FIG. 2 shows a side elevation view of the Faraday rotator die depicted in FIG. 1.

FIGS. 1 and 2 depict a Faraday rotator die comprising a single magnetic domain according to the invention, with two substantially parallel major surfaces 101 and 102, a clear aperture 103 and magnetization vector 4πM 104 normal to the major surfaces 101 and 102. There are two reasons to increase the specific Faraday rotation of a garnet Faraday rotator:

(1) It will allow a thinner 45-degree Faraday rotator and therefore decrease the device path length. This is an important design constraint for device designers in device size and performance. As beam deviation, spreading, dispersion, etc. increase with increasing path length, it is strongly desired to make the path length as short as possible.

(2) A reduced film thickness greatly improves crystal growth yields in thick film growth. As was stated above, the lack of elasticity and ease of fracture at room temperature constrain the film to have a close lattice match with the substrate. At growth temperatures, the film is more elastic and less prone to fracture, This is fortunate because there is a mismatch between the coefficients of thermal expansion of the film and the substrate, which results in substantial strain as the film grows. As the film increases in thickness, this stress results in a sharply increasing rate of breakage until at large thicknesses, the breakage rate becomes essentially 100%. This breakage limit is a complex function of film composition and growth conditions. (For a more complete discussion of this problem, see V. J. Fratello and R. Wolfe in Magnetic Film Devices, edited by M. H. Francombe and J. D. Adam, Volume 4 of *Handbook of Thin Film Devices: Frontiers of Research, Technology and Applications*, Academic Press, 2000). Typically the film must be grown significantly thicker than the finished device (20–40 μm) so that it may be fabricated to a device with a high optical finish, good yield and high optical throughput.

As detailed above, $Bi_X(Eu_ZHo_{1-Z})_{3-X}Fe_{5-Y}Ga_YO_{12}$ is the strongly preferred composition for magnetless Faraday rotators. CMZ:GGG is the strongly preferred and commercially available substrate material. Compositions with X>1.2 are highly desirable for both device design and crystal growth. However these cannot be grown with this film and substrate combination with the constraint of Z≧0.5 atoms per formula unit according to the teaching of the patent literature and commercial use.

Since the addition of bismuth raises the lattice parameter of the resulting film, it is necessary to lower the lattice parameter of the host rare-earth iron garnet in order to increase the bismuth concentration. The lattice parameter of $Eu_3Fe_5O_{12}$ is 12.498(3) Å and that of $Ho_3Fe_5O_{12}$ is 12.375 (3) Å (G. P. Espinosa, *J. Chem. Phys.* 37, 2344 (1962)). Using Vegard's law, the lattice parameter of a 1—1 solid solution $Eu_{1.5}Ho_{1.5}Fe_5O_{12}$ would be approximately 12.437 Å. Solid solutions with C(Eu)≦C(Ho) will have a lattice parameter ≦12.437 Å. Substitution with. Ga slightly decreases the lattice parameter of the host garnet by −0.018 Å/(a/fu). Therefore, the use of an increased amount of holmium could potentially allow the film to have increased amounts of bismuth and still substantially match the lattice of the substrate.

The difference in the lattice parameter between the film and the substrate should be in the range −0.012 Å≦LP(film)−LP(CMZ:GGG)≦0.006 Å, where LP(film) and LP(CMZ:GGG) are the room temperature lattice parameters of the epitaxial film and the CMZ:GGG substrate respectively. The larger negative range is because compositions in tension at room temperature are somewhat more resistant to breakage than compositions in compression. Experiments were done on relatively thin (50–100 μm) films to avoid effects of wafer bowing and gradient of film composition that increase with increasing film thickness.

The room temperature saturation magnetization, $4\pi M_s$ (22° C.), should be less than or equal to about 60 G. This is necessary in order to assure that a single domain state can be maintained over the operating range of the film. In addition, the poling or switching field required to pole the film to a single domain state is inversely proportional to the saturation magnetization. As a result, $4\pi M_s(22°$ C.) is preferably larger than or equal to about 10 G. This assures that the material can be poled to a single domain state in a field of reasonable magnitude.

Thick films were grown at Z approximately equal to 0.45. These were suitable for Faraday rotator applications at 1550 nm. Thin two-sided films were grown with Z approximately equal to 0.40. Data for compositions with lower Z in the range $0.35 \leq Z \leq 0.20$ are extrapolated and are therefore approximate. Shinagawa and Taniguchi (Japan. *J. Appl. Phys.* 13, 1663 (1974)) observed that the effective ionic radius of bismuth varied with the host rare earth lattice and this also limits the accuracy of calculation.

Many melt compositions and growth conditions can be used to grow the same crystal composition as are known to those of skill in the art. The melt compositions of Klages and Tolksdorf (*J. Cryst. Growth* 79, 110 (1986)) or Y. Toba (Japanese patent application Heisei 3-306697, filed Oct. 24, 1991) can be adapted to grow crystals of these compositions as was detailed in Brandle et al (U.S. Pat. Nos. 5,608,570 and 5,801,875). The inventive art is in the final composition of the resultant film.

EXAMPLE NUMBER 1

A garnet body of nominal composition $Bi_{1.3}(Eu_{0.45}Ho_{0.55})_{1.7}Fe_{4.05}Ga_{0.95}O_{12}$, and room temperature saturation magnetization 60 $G \geq 4\pi M_s(22° C.) \geq 10$ G is made as follows. Commercially available metal oxides of the relevant metals (99.99% or better purity) are weighed and mixed substantially as described in the above referenced Japanese patent application (Y. Toba, Japanese patent application Heisei 3-306697, filed Oct. 24, 1991). The garnet constituent composition is substantially as defined in U.S. Pat. Nos. 5,608,570 and 5,801,875, the drawings and descriptions of which are herein incorporated by reference with the change that a 45% $Eu_2O_3$-55% $HoO_3$ mixture is used. The mixture is melted in conventional manner in a chemically pure platinum crucible using known fluxes as given by Kiages and Tolksdorf (*J. Cryst. Growth* 79, 110 (1986)) or Y. Toba (Japanese patent application Heisei 3-306697, filed Oct. 24, 1991). After being fully melted, stirred and attaining thermal and chemical equilibrium at 850° C., the melt is cooled to a temperature below its saturation temperature and allowed to attain thermal equilibrium once again.

A single crystal substrate wafer of composition $\{Gd_{2.68}Ca_{0.32}\}[Ga_{1.04}Mg_{0.32}Zr_{0.64}](Ga_3)O_{12})$ with a surface finish suitable epitaxial growth is lowered to a point above the melt and allowed to come to thermal equilibrium. The substrate is then lowered to the surface of the melt such that only the lower surface is in contact with the melt. The substrate is rotated at 40 rpm with rotation reversal every 1–5 cycles. Growth commences immediately on the lower surface only. After attainment of the desired thickness (300–600 $\mu$m for devices in the telecommunications wavelengths), the film is lifted off the surface of the melt, spun rapidly unidirectionally to remove any residual flux and cooled slowly to room temperature.

The resultant film is cleaned in acid to remove any residual flux, removed from the holder by mechanical means and diced into "slabs" approximately 11 mm square. The film is then characterized by 1) measuring the room temperature saturation magnetization with a vibrating sample magnetometer and 2) measuring the difference between the lattice parameters of the film and the substrate with an x-ray diffractometer. According to the results of the saturation magnetization measurement, the gallium concentration of the melt is adjusted to achieve a value in the desired range 60 $G \geq 4\pi M_s(22° C.) \geq 10$ G. According to the results of the lattice parameter measurement, the growth temperature is adjusted to achieve a lattice match in the desired range– 0.012 Å$\leq$LP(film)–LP(CMZ:GGG)$\leq$0.006 Å. The sensitivity of the process to a wide variety of process parameters makes this iterative process necessary to determine the precise melt composition and growth conditions necessary.

For manufacture of finished devices and determination of magnetooptic parameters, the slab is lapped to remove the substrate and both sides polished to achieve the desired thickness for a 45-degree Faraday rotator. An anti-reflection coating is applied to both sides of the slab and the slab is then diced into finished "die" of specified dimensions (see FIG. 1). The magnetooptical properties of these die are measured to determine conformity.

EXAMPLE NUMBER 2

Garnet films of thickness 50–100 $\mu$m were formed by the method of EXAMPLE 1 on both sides of a small substrate with the ratio of europium to total rare earth C(Eu)/(C(Eu)+C(Ho))=Z=0.40. This is achieved by using a 40% $EU_2O_3$-60% $Ho_2O_3$ mixture In the process. The melt composition and growth conditions were adjusted to achieve 60 $G \geq 4\pi M_s$ (22° C.)$\geq$10 G and –0.012 Å$\leq$LP(film)–LP(CMZ:GGG) $\leq$0.006 Å. The substrate was submerged below the surface of the melt to give two-sided growth. The resultant film-substrate-film composite was lightly polished on both sides and anti-reflection coated on both external sides. No coating was possible at the film-substrate interfaces, but this arrangement is sufficient to obtain data on specific Faraday rotation. The film properties are shown in Table I. This procedure may be similarly varied to achieve melts and films with Z in the range 0.20 to 0.35.

TABLE I

| Z | X (a/fu) | Y (a/fu) | $\Theta_F$(1550 nm)/t (degrees/$\mu$m) | t, thickness for 45 degrees ($\mu$m) |
|---|---|---|---|---|
| 0.50 (prior art) | 1.16[a] | 0.950[a] | 0.090 ± 0.002[c] | 500 ± 11[c] |
| 0.45 | 1.22[a] | 0.956[a] | 0.095 ± 0.002[c] | 474 ± 10[c] |
| 0.40 | 1.28[a] | 0.961[a] | 0.098 ± 0.002[c] | 459 ± 9[c] |
| 0.35 | 1.33[b] | 0.965[b] | 0.103[b] | 437[b] |
| 0.30 | 1.38[b] | 0.970[b] | 0.106[b] | 425[b] |
| 0.25 | 1.43[b] | 0.974[b] | 0.110[b] | 409[b] |
| 0.20 | 1.48[b] | 0.978[b] | 0.113[b] | 398[b] |

[a]Determined from melt replacement fractions
[b]Extrapolated/calculated
[c]Measured The preferred embodiment of magnetless Faraday rotator materials with improved specific Faraday rotation can be determined from these data. The functional relationship of X, the bismuth concentration and Y, the gallium concentration, to Z, the europium fraction of rare earth in the film can be fit to the following equations:

$$X = 1.62 - 0.59 \times Z - 0.67 \times Z^2 \pm 0.05 \text{ atoms per formula unit}$$

$$Y = 0.991 - 0.052 \times Z - 0.059 \times Z^2 \pm 0.05 \text{ atoms per formula unit}$$

Figure 3:
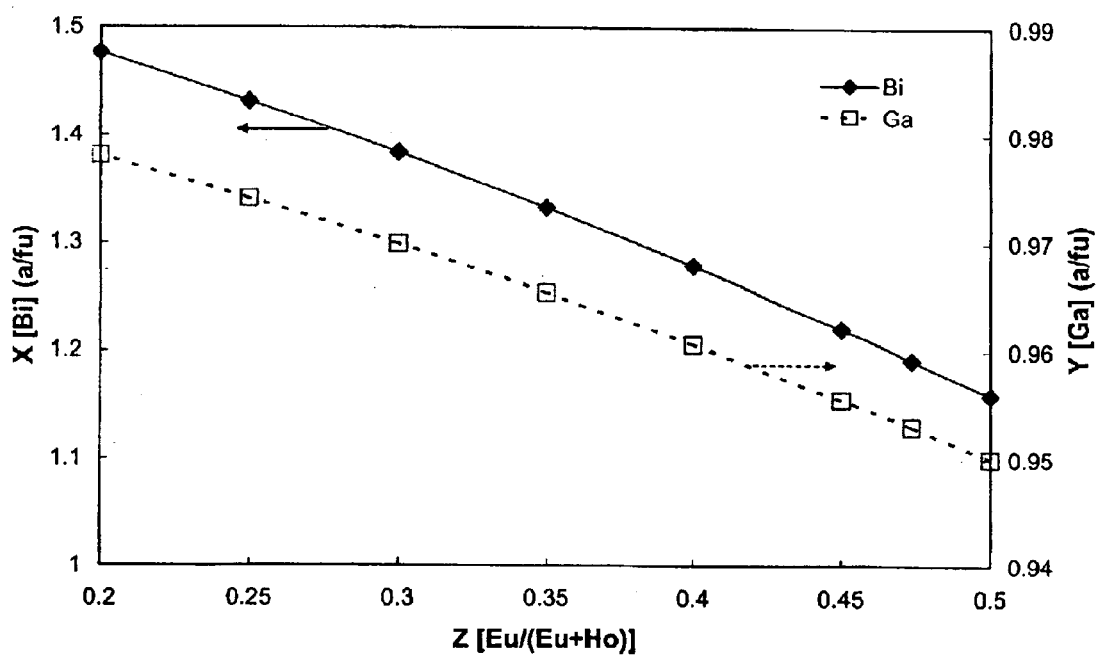
FIG. 3 is a graph of the relationship between the concentrations of Bi and Ga to the fraction of europium in the rare earths used in a preferred embodiment.

These relationships are depicted in FIG. 3, which is a graph showing the concentration of Bi In atoms per functional unit on the first ordinate axis, Z, which is the ratio of Eu to the total concentration of rare earths on the abscissa axis, and the concentration of Ga in atoms per functional unit on the second ordinate axis.

Figure 4:
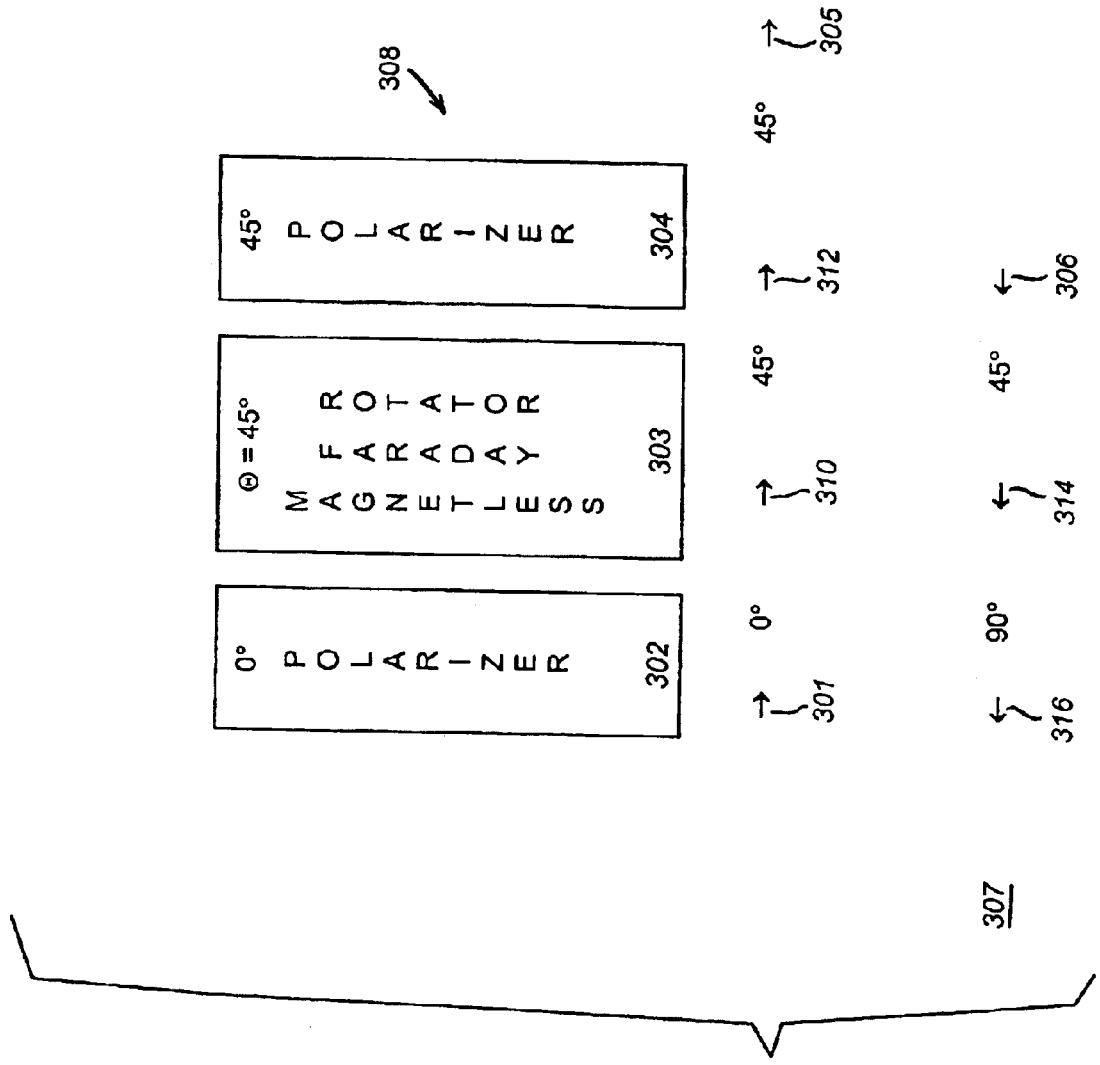
FIG. 4 shows a magnetless polarization-dependent free-space isolator utilizing a Faraday rotator die according to the invention, and illustrates the propagation of light through the isolator.

Referring to FIG. 4, garnet article 303 may be coupled with 0° polarizer 302 and 45° polarizer 304 to form isolator 308 that is a magnetless polarization-dependent free-space isolator. Similarly, such garnet articles may be utilized in polarization independent isolators, circulators, magnetooptic switches, interleavers and other non-reciprocal devices, subsystems or systems.

FIG. 4 also depicts how light propagates through isolator 308 depicted in FIG. 4. In forward propagation, light 301, which can be polarized or unpolarized, enters 0° polarizer 302 from the left. Polarizer 302 prevents all light from passing that is not at 0° rotation. Light 310 exits polarizer 302, necessarily at 0° rotation, and enters garnet film 303, which rotates light 310 45°. Light 312 exits film 303 and is now at 45° of rotation. Light 312 can then pass through 45° polarizer 304 and exit from isolator 308 as light 305 with 45° of rotation.

On the other hand, in reverse propagation, light 306 enters isolator 308 from the right. Only light at 45° of rotation can pass through 45° polarizer 304. Light 314, which necessarily is at 45° of rotation, exits polarizer 304 and passes through film 303, where it is further rotated 45°. Light 316 exits film 303 at 90° of rotation and enters polarizer 302. However, 0° polarizer 302 only allows light with 0° of rotation to pass through. Consequently, none of light 316 can pass completely through isolator 308 and no light propagates in space 307. In this way, isolator 308 only allows light to pass through it in one direction, regardless of whether the light is polarized.

The above descriptions of certain embodiments are made for the purposes of illustration only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventor is legally entitled.

What is claimed is:

1. An article comprising a body of magnetooptic garnet material having a nominal composition $Bi_X(Eu_ZHo_{1-Z})_{3-X}Fe_{5-Y}Ga_YO_{12}$, and a saturation magnetization, $4\pi M_s$, formed such that:
   a. said saturation magnetization at room temperature, $4\pi M_s(22°\ C.)$, is less than about 60 G;
   b. said material has a lattice parameter LP(film) and is formed on a substrate of approximate composition $\{Gd_{2.68}Ca_{0.32}\}[Ga_{1.04}Mg_{0.32}Zr_{0.64}](Ga_3)O_{12}$ having a lattice parameter LP(substrate), such that $-0.012\ Å \leq LP(\text{film})-LP(\text{substrate}) \leq +0.006\ Å$;
   c. Z greater than 0 and is less than or equal to about 0.45;
   d. X is greater than or equal to about 1.2 atoms per formula unit;
   e. Y is greater than 0 and less than 5.

2. The article of claim 1, wherein said saturation magnetization at room temperature, $4\pi M_s(22°\ C.)$, is greater than about 10 G.

3. The article of claim 1, wherein X, in atoms per formula unit, is in the range:

$$1.67-0.59 \times Z-0.67 \times Z^2 \geq X \geq 1.57-0.59 \times Z-0.67 \times Z^2.$$

4. The article of claim 3, wherein Y, in atoms per formula unit, is in the range:

$$1.041-0.052 \times Z-0.059 \times Z^2 \geq Y \geq 0.941-0.052 \times Z-0.059 \times Z^2.$$

5. The article of claim 1, wherein Y, in atoms per formula unit, is in the range:

$$1.041-0.052 \times Z-0.059 \times Z^2 \geq Y \geq 0.941-0.052 \times Z-0.059 \times Z^2.$$

6. The article of claim 1, wherein said magnetooptic garnet material further has a nominal composition $Bi_X(Eu_ZHo_{1-Z-Q}R_Q)_{3-X}Fe_{5-Y}Ga_YO_{12}$, such that R is one or more substituents selected from the group consisting of the rare earths (atomic elements 57–71, excluding Eu and Ho), Pb, Y and Ca.

7. The article of claim 6, wherein Q is in the range 0–0.2.

8. The article of claim 1, wherein said magnetooptic garnet material has a nominal composition $Bi_X(Eu_ZHo_{1-Z})_{3-X}Fe_{5-Y}Ga_YM_TO_{12}$ such that M is one or more substituents selected from the group consisting of Al, Si, Ge, Sc, In, Pt, Mg, Zr, Hf, Ti, V, Cr, Mn, Co, Ni and Ru.

9. The article of claim 8, wherein T is in the range 0–0.2.

10. An article comprising a body of magnetooptic garnet material having a nominal composition $Bi_X(Eu_ZHo_{1-Z})_{3-X}Fe_{5-Y}Ga_YO_{12}$ and a saturation magnetization $4\pi M_s$, formed such that:
    a. said saturation magnetization at room temperature, $4\pi M_s(22°\ C.)$, is less than about 60 G and greater than about 10 G;
    b. said material has a lattice parameter LP(film) and is formed on a substrate of approximate composition $\{Gd_{2.68}Ca_{0.32}\}[Ga_{1.04}Mg_{0.32}Zr_{0.64}](Ga_3)O_{12}$ having a lattice parameter LP(substrate), such that $-0.012\ Å \leq LP(\text{film})-LP(\text{substrate}) < +0.006\ Å$;
    c. Z is greater than 0 and is less than or equal to about 0.45;
    d. X, in atoms per formula unit, is in the range:

$$1.67-0.59 \times Z-0.67 \times Z^2 \geq X \geq 1.57-0.59 \times Z-0.67 \times Z^2;\ \text{and}$$

e. Y, in atoms per formula units is in the range:

$$1.041-0.052 \times Z-0.059 \times Z^2 \geq Y \geq 0.941-0.052 \times Z-0.059 \times Z^2.$$

11. The article of claim 10 wherein the article is a polarization dependent isolator.

12. The article of claim 10 wherein the article is a polarization independent isolator.

13. The article of claim 10 wherein the article is an optical circulator.

14. The article of claim 10 wherein the article is a magnetooptic switch.

15. The article of claim 10 wherein the article is an interleaver.

16. The article of claim 10, wherein said article is incorporated into a non-reciprocal device, subsystem or system.

17. An article comprising a body of magnetooptic garnet material having a nominal composition $Bi_X(Eu_ZHo_{1-Z-Q}R_Q)_{3-X}Fe_{5-Y}Ga_YM_TO_{12}$ and a saturation magnetization $4\pi M_s$, formed such that:
    a. said saturation magnetization at room temperature, $4\pi M_s(22°\ C.)$, is less than about 60 G and greater than about 10 G;
    b. said material has a lattice parameter LP(film) and is formed on a substrate of approximate composition $\{Gd_{2.68}Ca_{0.32}\}[Ga_{1.04}Mg_{0.32}Zr_{0.64}](Ga_3)O_{12}$ having a lattice parameter LP(substrate), such that $-0.012\ Å \leq LP(\text{film})-LP(\text{substrate}) \leq +0.006\ Å$;
    c. Z greater than 0 and is less than or equal to about 0.45;
    d. X, is greater than or equal to about 1.2 atoms per formula unit;
    e. R is one or more substituents selected from the group consisting of the rare earths (atomic elements 57–71, excluding Eu and Ho), Pb, Y and Ca;
    f. Q is in the range 0–0.2;

g. M is one or more substituents selected from the group consisting of one or more of Al, Si, Ge, Sc, In, Pt, Mg, Zr, Hf, Ti, V, Cr, Mn, Co, Ni and Ru;

h. T is in the range 0–0.2;

i. Y is greater than 0 and less than 5.

18. The article of claim 17 wherein the article is a polarization dependent isolator.

19. The article of claim 17 wherein the article is a polarization independent isolator.

20. The article of claim 17 wherein the article is an optical circulator.

21. The article of claim 17 wherein the article is a magnetooptic switch.

22. The article of claim 17 wherein the article is an interleaver.

23. The article of claim 17, wherein said article is incorporated into a non-reciprocal device, subsystem or system.

* * * * *

UNITED STATES PATENT AND TRADEMARK OFFICE
CERTIFICATE OF CORRECTION

PATENT NO.   : 6,770,223 B1
DATED        : August 3, 2004
INVENTOR(S)  : Abbott et al.

It is certified that error appears in the above-identified patent and that said Letters Patent is hereby corrected as shown below:

Column 1,
Line 20, replace "gamet" with -- garnet --.
Line 38, replace "A" with -- Å --.
Line 48, replace "Mapn" with -- Magn --.
Line 62, replace "gamets" with -- garnets --.

Column 2,
Line 5, replace "Maqn" with -- Magn --.
Line 44, replace "$O_{122}$" with -- $O_{12}$ --.
Line 57, replace "gamet" with -- garnet --.

Column 3,
Line 8, replace "Identified" with -- identified --.
Line 50, replace "magnedess" with -- magnetless --.

Column 4,
Line 63, replace "D S" with -- DS --.

Column 6,
Line 23, replace "40" with -- 60 --.

Column 8,
Lines 24 and 61, replace "In" with -- in --.

Column 10,
Line 25, replace "<" with -- $\leq$ --.
Line 60, add -- is -- after "Z".

UNITED STATES PATENT AND TRADEMARK OFFICE
CERTIFICATE OF CORRECTION

PATENT NO. : 6,770,223 B1
DATED : August 3, 2004
INVENTOR(S) : Abbott et al.

It is certified that error appears in the above-identified patent and that said Letters Patent is hereby corrected as shown below:

Column 11,
Line 4, add -- and -- after ";".

Signed and Sealed this

First Day of February, 2005

JON W. DUDAS
*Director of the United States Patent and Trademark Office*